US012792365B1

(12) United States Patent
Hariharan et al.

(10) Patent No.: US 12,792,365 B1
(45) Date of Patent: Nov. 10, 2026

(54) ENHANCED MANAGEMENT OF PLUGIN CYCLES IN A DISTRIBUTED GRAPH ENVIRONMENT USING GOVERNED LABELS

(71) Applicant: Amazon Technologies, Inc., Seattle, WA (US)

(72) Inventors: Sriraam Hariharan, Bothell, WA (US); Scott Erwin Barber, Madrid (ES); Krishnan A. Kolazhi, Kirkland, WA (US); Whitney Jade Burian, Mukilteo, WA (US); Scott Gerstmann, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 133 days.

(21) Appl. No.: 18/975,245

(22) Filed: Dec. 10, 2024

(51) Int. Cl.

| | |
|---|---|
| ***G06F 15/177*** | (2006.01) |
| ***G06F 9/00*** | (2018.01) |
| ***G06F 9/24*** | (2006.01) |
| ***G06F 9/445*** | (2018.01) |

(52) U.S. Cl.
CPC ...... *G06F 9/44526* (2013.01); *G06F 9/44505* (2013.01)

(58) Field of Classification Search
CPC ......................... G06F 9/44526; G06F 9/44505
See application file for complete search history.

(56) References Cited

U.S. PATENT DOCUMENTS

| | | | | |
|---|---|---|---|---|
| 12,655,734 | B2 * | 6/2026 | Roussel | E21B 43/26 |
| 2007/0229267 | A1 * | 10/2007 | Traub | H04L 67/34 340/572.1 |
| 2013/0263088 | A1 * | 10/2013 | Hoff | G06F 9/45529 717/121 |
| 2016/0092246 | A1 * | 3/2016 | Lagerblad | G06F 9/44526 719/331 |
| 2024/0143344 | A1 * | 5/2024 | Campos | G06F 9/44526 |
| 2025/0307315 | A1 * | 10/2025 | Khatri | G06F 16/901 |
| 2026/0030039 | A1 * | 1/2026 | Harris | G06F 16/90344 |
| 2026/0072649 | A1 * | 3/2026 | Lefort | G06F 8/30 |

* cited by examiner

*Primary Examiner* — Xuxing Chen
(74) *Attorney, Agent, or Firm* — Eversheds Sutherland (US) LLP

(57) ABSTRACT

Devices, systems, and methods for mitigating plugin cycles for plugin configurations federated from multiple pipelines may include identifying a requested modification to a plugin configuration, initiating a label governance workflow, approving the requested modification when it results in no plugin cycle or rejecting the requested modification when it results in a plugin cycle, allowing for updated labels from the cycling plugins to provide updated labels for data causing the plugin cycle, and initiating another label governance workflow to evaluate whether any plugin cycle occurs using the updated labels. When no plugin dependency occurs as a result of a plugin modification, the plugin modification may be approved, and a plugin dependency graph may update using the updated labels. Plugins may execute based on the plugin dependency graph.

20 Claims, 7 Drawing Sheets

502

| Plugin | Consumes | Produces |
|---|---|---|
| A | Nothing | Data Entity(Data Entity_A) |
| B | Data Entity(Data Entity_A) | Data Entity(Data Entity_B) |
| C | Data Entity(Data Entity_B) | Data Entity(Data Entity_C) |
| D | Data Entity(Data Entity_C) | Data Entity(Data Entity_D) |

ENHANCED MANAGEMENT OF PLUGIN CYCLES IN A DISTRIBUTED GRAPH ENVIRONMENT USING GOVERNED LABELS

BACKGROUND

Cycle detection and elimination for plugin configurations vended through a single pipeline is possible because cycles may be observed at build time for plugin changes and may be resolved by specifying a file that one plugin executes after another plugin if both plugins have cyclic dependencies between them. There is a need to detect and eliminate plugin cycles when plugins are federated from multiple pipelines.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
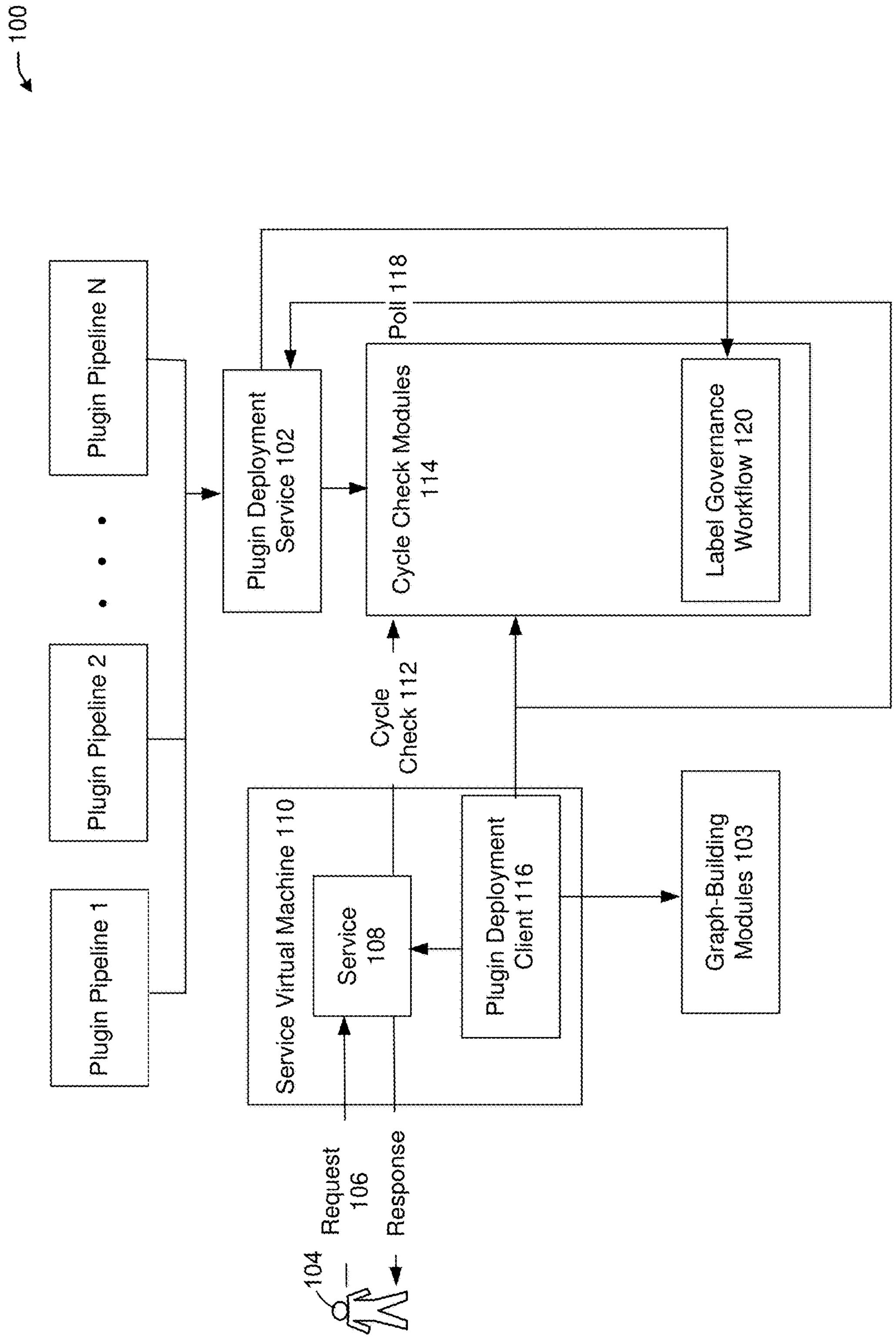
FIG. 1 is an example system architecture showing enhanced management of plugin cycles, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhancing detection and management of plugin cycles in a distributed graph environment using governed labels.

Plugins are software components that add features to existing computer programs, and plugins may be used as add-ons or extensions. Plugins may include plugin configurations and the actual data produced by the plugins. Plugin configurations are sets of plugin parameters that plugins may apply when executed, such as the inputs and outputs of a plugin. Plugin cycling (e.g., dependency cycling) occurs when plugins depend on each other. Some plugins may include a remotely executing code that includes the logic of the plugin, and also may include a plugin configuration (also referred to as a plugin registration). A plugin configuration may be provided to an engine that executes plugins by plugins from another code deployment pipeline. Plugin configurations may include information such as configurations to call a given plugin (e.g., endpoint, protocol, etc.), input data need, output data vended, error handling, and the like.

Plugin configurations may be vended through a single pipeline, allowing cycle detection and elimination to be straightforward because cycles may be observed at build time for any change, and may be resolved by directly specifying (e.g., in a file, based on domain knowledge) that one plugin executes after another plugin when both plugins have cyclic dependencies on each other.

As plugin configurations become federated from multiple pipelines, cycle detection and prevention become more challenging. In particular, handling cycles meaningfully in a distributed graph model is a challenge. Federation also means that there is no single source code repository that would allow a developer or other party to define cycle-breaking instructions. Before deployments of plugin configurations from multiple pipelines, an example cycle breaking instruction may be to "always execute plugin after another plugin," which can break any cycles between the two plugins.

Multiple scenarios below illustrate the technical problem and solution provided herein. In one situation, Plugin A from Pipeline A is to consume and modify certain information, and Plugin B from Pipeline B also is to consume and modify the same information, so a cyclic dependency exists and is identified when the engine identifies both changes. In another situation, one plugin may produce a less precise answer at a point in execution after variables are known, and another plugin may produce a more precise answer after an additional variable is known, so a cyclic dependency exists between the two plugins. In another situation, a plugin exists for a time period to evaluate data, and another plugin is to onboard after the time period, which would modify the data for the other plugin's use case. Due to security/privacy reasons, the other plugin may not intend to co-host its logic in the first plugin's hosts, so the two plugins are different, and the other plugin may consume and modify data produced by the first plugin. Therefore a cyclic dependency exists.

In one or more embodiments, to address the cyclic dependencies of plugins in federated pipelines, the present disclosure provides enhanced use of governed labels. One aspect of the present disclosure includes label indirection. Labels may be used to provide human-readable, conceptual names for any intermediate layer of an orchestration (e.g., chargesWithPrice and chargesWithShpping, etc.) to denote different stages of computations. The labels may be created on the plugin registrations and governed by the engine and owners of the data. No code change is needed on the remote code of the plugins for producers or consumers of the data.

Another aspect of the present disclosure involves plugin dependency analysis and topological sorting. This capability may be augmented by adding an ability to use the label indirection to break cycles. For example, when both Plugin A and Plugin B are to modify the same data one after the other for a respective use case, they may be forced to declare a meaningful label to their version of the data. For example, Plugin A may provide a label to its data, and Plugin B may provide a different label to its version of the data. As a result, Plugin A may consume the original data and produce its version of the data using its label, and Plugin B may consume the data labeled by Plugin A to produce its version of the data using Plugin B's version of the label. The indirection is not known to the remote code components producing the data for the two plugins, so the plugins may remain consistent with their interface without requiring any code changes. The indirection also may not be known to any other downstream consumer of the data produced by the plugins because the data will still be labeled with its original label, and the plugin-specific labels may be used only for the cycle management.

Another aspect of the present disclosure includes governance. Whenever cycles are detected (e.g., build or deployment time), the plugin writers may be redirected to a governance workflow that may show them the reasons for a cycle's existence. Because cycles may be with multiple plugins at a same time, all cycles may be shown, and mitigation options may be provided. Using the labeling approach above, the plugin writer may work with other plugins to develop labels for the data creating cycles. Once a governance has been applied, plugin registrations may be updated to provide disambiguating label names without changing the remote code or consumer code (e.g., code consuming the plugin outputs). As a result, plugins may have approvals to modify data produced by another plugin to ensure agreement on modifications and labels.

Technical benefits of the present disclosure include self-contained/distributed deployments support. While other techniques require resolution information to be part of a shared metadata definition, the label-based information herein is self-contained in the plugin definition. As a result, each plugin may deploy independently of other plugins from separate pipelines, and when there is a detected cycle before or during a plugin deployment, a governance process may be initiated. In addition, remote changes are enabled by the enhanced techniques herein. In the execution engine, each plugin may have a registration and remote code component, with the remote code having a higher burden to change and a possibility of being used by multiple systems. As a result, changing critical code like names of plugin data produced is undesirable. Using the enhanced labeling approach herein allows for indirection to live on the configuration side (e.g., plugin registration), and the same benefit applies to consumers of the plugin data such as other plugins, client devices calling the execution engine, or the like. The enhanced governance herein is facilitated by the labels, which are governed and therefore any plugin may not change labels of data not owned by that plugin. Plugin cycle detection and resolution therefore may be tightly governed and federated so that only the plugins with cycles may participate in the governance workflows. In addition, the enhanced techniques herein improve correctness because of the labels, as the intermediate data dependency is more accurately modeled and any changes to the labels may be blocked when existing consumers of the labeled data may be impacted.

In an example, when two plugins both consume or produce the same data, but the dependency between them may be unknown and/or it is unclear which plugin to consume first. Using an implicit order may not be useful. Alternatively, an explicit override may be used. However, these existing techniques fall short for labels. The enhanced techniques herein solve the problem by having different plugin configurations use different labels for the same data, and applying a governance for the labels. Because the enhanced labeling techniques herein are within the plugin configurations, they are agnostic to remote changes (e.g., plugins do not need to change outputs or inputs to consume the labeled data). Unlike the implicit ordering, the labels herein are provably correct, as the plugin execution ordering may be simulated to verify the correct execution ordering.

In one or more embodiments, the architecture facilitating the enhanced plugin cycling detection and prevention herein may include a virtual machine (e.g., Java virtual machine or otherwise) with a plugin execution engine and a plugin deployment client. When a user provides a request to the plugin execution engine, the engine may perform a cycle check to identify and enumerate cycles at compile or deployment time. A plugin deployment service may receive plugin registrations from multiple federated plugin deployment pipelines, and the engine may perform the cycle check on the plugin registrations provided by the plugin deployment service. The plugin deployment client may periodically or continuously poll the plugin deployment service for changes/updates to plugin registrations in the various pipelines, and may notify the engine of the changes/updates to trigger the cycle check. When there is a detected cycle before or during a plugin deployment, a governance process may be initiated. The engine may use a graph-building algorithm for the changes/updates, using a topological sort and, when there is a cycle, may resolve the cycle using the enhanced label information.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 is an example system architecture 100 showing enhanced management of plugin cycles, in accordance with one or more embodiments of the present disclosure.

Referring to FIG. 1, multiple plugin deployment pipelines 1-N (e.g., deployment plugin pipeline 1 for plugin registration 1, deployment plugin pipeline 2 for plugin registration 2, etc.) may be independent of each other and may produce independent plugin configurations. The plugin configurations are provided to a plugin deployment service 102. When a new plugin configuration is deployed at the plugin deployment service, a plugin dependency graph is updated (e.g., by graph-building modules 103). When a user 104 submits a request 106 to a service 108 (e.g., hosted by a service virtual machine 110) to execute a plugin, the service 108 may perform a cycle check 112 via cycle check modules 114. A plugin deployment client 116 of the service virtual machine 110 may continuously or periodically poll 118 the plugin dependency service 102 for changes to plugin registrations. When there is a change to plugin registrations, the cycle check modules 114 may identify and enumerate cycles at plugin compile or deployment time. A label governance workflow 120 (e.g., as part of of the cycle check modules 114) may open a federated governance workflow for cyclic data dependencies, during which teams may decide to create logical labels to data elements of the plugins. Code changes made to a plugin registration do not affect any remote service or plugin consumers, and the cyclic dependency is fixed. The graph building modules 103 may use a topological sort, and if there is a cycle, may resolve the cycle using the label information.

When a plugin cycle is detected, whether at compile or deployment, changing a plugin dependency may have significant downstream impact, especially when multiple users and/or services rely on the plugin. However, a change is normally required. By using the enhanced labeling techniques herein, in which the labels are provided by the plugin configurations, the cycle dependency may be resolved using the labels without requiring remote code changes. Because the labels are governed by the label governance workflow 120, a plugin cannot change labels of data not owned by the plugin. In addition, only plugins with cycles may participate in the cycle detection and resolution, limiting the number of users needed to participate. Any changes to a label may be blocked if there are existing data consumers who would be impacted.

In one or more embodiments, to address the cyclic dependencies of plugins in federated pipelines, the system architecture 100 provides enhanced use of governed labels. One aspect of the present disclosure includes label indirection. Labels may be used to provide human-readable, conceptual names for any intermediate layer of an orchestration to denote different stages of computations. The labels may be created on the plugin registrations and governed by the service 108 and owners of the data. No code change is needed on the remote code of the plugins for producers or consumers of the data.

Another aspect of the present disclosure involves plugin dependency analysis and topological sorting. This capability may be augmented by adding an ability to use the label indirection to break cycles. For example, when both Plugin 1 and Plugin 2 are to modify the same data one after the other for a respective use case, they may be forced to declare a meaningful label to their version of the data. For example, Plugin 1 may provide a label to its data, and Plugin 2 may provide a different label to its version of the data. As a result, Plugin 1 may consume the original data and produce its version of the data using its label, and Plugin 2 may consume the data labeled by Plugin 1 to produce its version of the data using Plugin 2's version of the label. The indirection is not known to the remote code components producing the data for the two plugins, so the plugins may remain consistent with their interface without requiring any code changes. The indirection also may not be known to any other downstream consumer of the data produced by the plugins because the data will still be labeled with its original label, and the plugin-specific labels may be used only for the cycle management.

Another aspect of the present disclosure includes the label governance workflow 120. Whenever cycles are detected (e.g., build or deployment time), the plugin writers may be redirected to the label governance workflow 120 that may show them the reasons for a cycle's existence. Because cycles may be with multiple plugins at a same time, all cycles may be shown, and mitigation options may be provided. Using the labeling approach above, the plugin writer may work with other plugins to develop labels for the data creating cycles. Once a governance has been applied, plugin registrations may be updated to provide disambiguating label names without changing the remote code or consumer code (e.g., code consuming the plugin outputs). As a result, plugins may have approvals to modify data produced by another plugin to ensure agreement on modifications and labels.

The enhanced data labels herein indicate positions in the dependency graph (e.g., a point in time during a plugin execution). When multiple requests are for the same data, and that data are modified multiple times by different parties, it is important to determine which point in the dependency graph after the data has been modified is sufficient. In this manner, the cycle dependency may be broken by using the enhanced labels for the same data.

The graph-building modules 103 may form a dependency graph using the label information from the plugin configurations. To form the graph, the graph-building modules 103 may perform a topological sort. When there is deadlock somewhere as a result of a dependency cycle, the graph-building modules 103 may use the enhanced labels to determine how to proceed in building the dependency graph. For example, if plugin 1 and plugin 2 both want to modify a data element, they may be forced to declare a meaningful label to their version of the data element. Plugin 1 and plugin 2 may provide their respective labels. Plugin 1 may consume the data element and produce a labeled output using its label. Plugin 2 may consume the labeled output of plugin 1 and produce an output with a different label. The indirection is not known to the remote code of the plugins each producing the outputs without requiring any code changes, and is not known to any downstream consumer of the output because the output data still uses the same name while the plugin labels are only used for the cycle management.

When the cycle check modules 114 detect a cycle, plugin authors are redirected to the label governance workflow 120 to show why there is a dependency cycle. The label governance flow 120 may show any cycles detected and any cycle mitigation options. Using the labeling, each plugin author may input labels for the data that is creating a cycle. Once the labels are provided, the plugin registrations are updated to provide the disambiguating label names without changing remote code of the plugins or the consumer code using the plugins. Once the dependency cycle is resolved, the service 108 may call the requested plugin.

Figure 2:
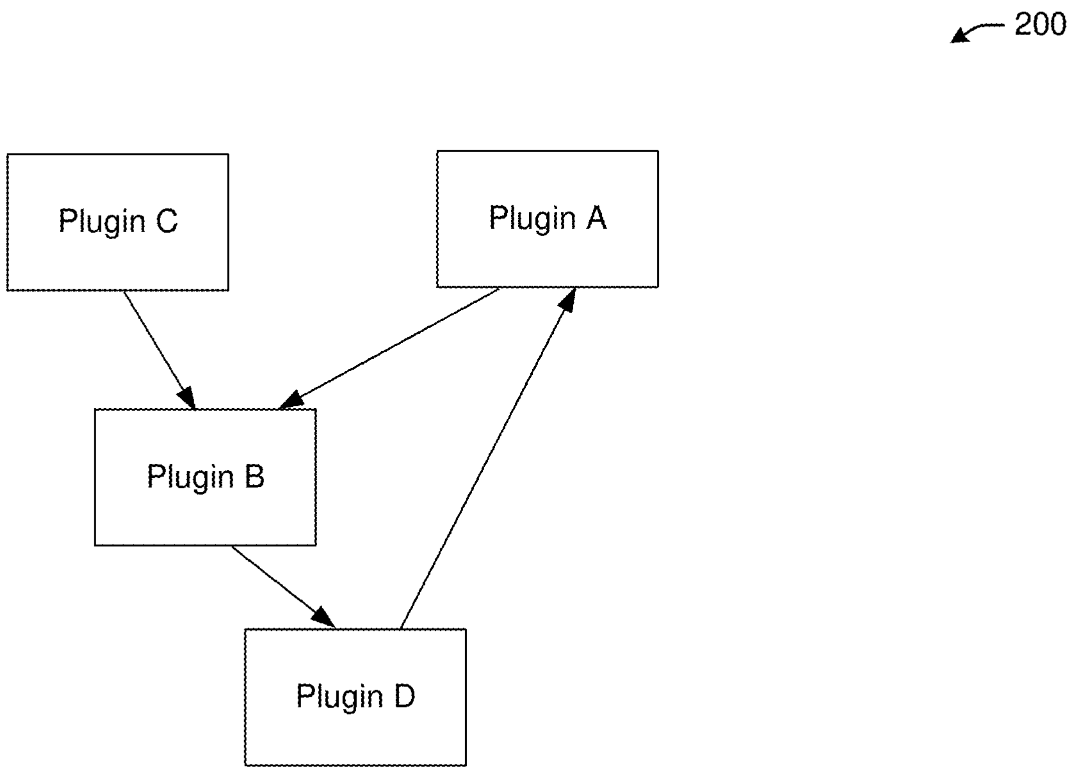
FIG. 2 shows an example plugin cycle dependency in accordance with one or more embodiments of the present disclosure.

FIG. 2 shows an example plugin cycle dependency 200 in accordance with one or more embodiments of the present disclosure.

Plugins A-D are shown in FIG. 2 along with their dependencies. Plugins A and C both depend from Plugin B, which depends from Plugin D, which depends from Plugin A. Therefore, there is a cycle (Plugin A-Plugin B-Plugin D-Plugin A) that requires a conflict resolution. The authors of the conflicting plugins may be redirected to the label governance workflow 120 of FIG. 1 to provide different labels for the same data that causes the dependency cycle. Using the different labels, the graph-building modules 103 may build the dependency graph without a dependency cycle so that the service 108 may execute any of Plugins A-D.

Figure 3:
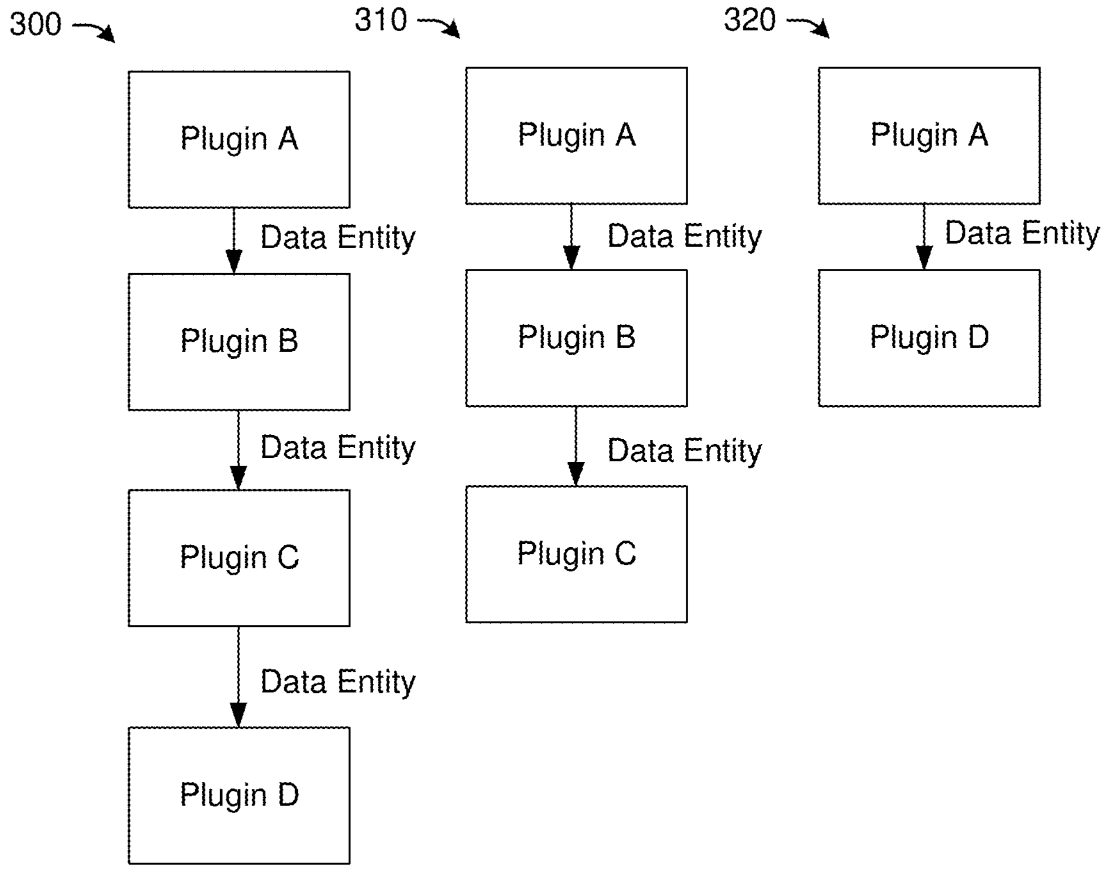
FIG. 3 shows example plugin cycle dependencies from multiple plugins orchestrating to populate one reference in accordance with one or more embodiments of the present disclosure.
Figure 4:
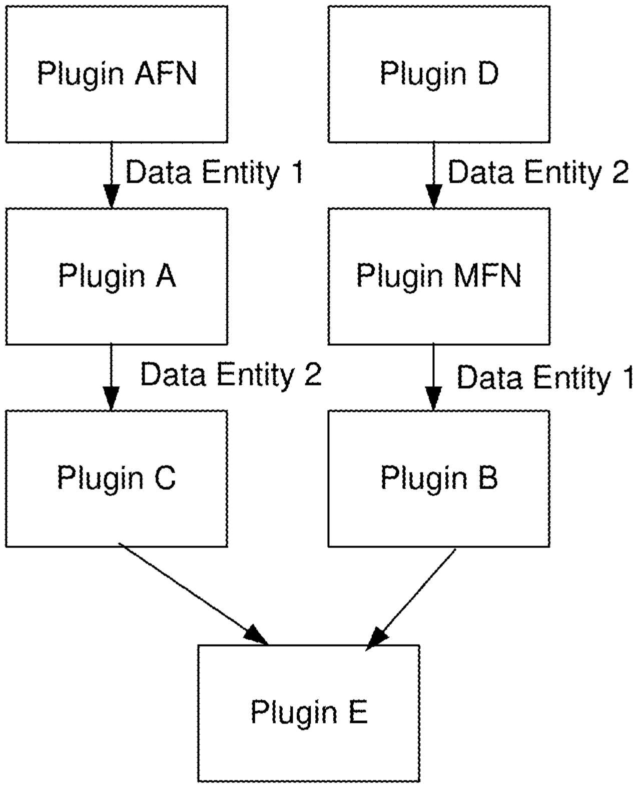
FIG. 4 shows an example of plugins that are mutually exclusive and produce different versions of a same reference in accordance with one or more embodiments of the present disclosure.

Dependency cycles may arise due to the following reasons: multiple plugins orchestrate to populate one reference (as shown in FIG. 3), and plugins that are mutually exclusive produce different versions of the same reference (as shown in FIG. 4).

FIG. 3 shows example plugin cycle dependencies from multiple plugins orchestrating to populate one reference in accordance with one or more embodiments of the present disclosure.

Referring to FIG. 3, there are cases where multiple plugins build on top of the same data entity to produce a consolidated entity. In this case, it is important for plugins to be aware of each others' order. For example, in the three executions of the same graph (e.g., execution 300, execution 310, and execution 320), each execution produces a data entity. Not all plugins in a chain need to execute to produce a final data entity, which is significant to downstream consumers. Therefore, changing the intermediate reference names (e.g., labels) to "a_data_entity," "b_data_entity," "c_data_entity," and "d_data_entity" for each of the plugins may not work because the downstream consumer using the service 108, clients, workflows, and the like are looking for "data entity." The label-based indirection described above therefore may solve the problem.

FIG. 4 shows an example of plugins that are mutually exclusive and produce different versions of a same reference in accordance with one or more embodiments of the present disclosure.

Referring to FIG. 4, data entity 1 is produced by both Plugin AFN and Plugin MFN, which do not depend on each other, so they technically may overwrite each other in a race condition. Data entity 2 is produced by both Plugin D and Plugin A. Plugin C and Plugin D depend on Plugin E. In reality, the Plugin AFN and Plugin MFN invocations are mutually exclusive due to invocation conditions. This means that Plugin A is mutually exclusive to Plugin MFN, and therefore Plugin A-Plugin MFN-Plugin A is not an actual cycle that will occur at runtime. However, the conflict has to be resolved.

There are multiple issues with the use case of FIG. 4. One issue is that the mutual exclusion cannot be validated at check-in time because it is not a simple inversion of invocation conditions. The mutual exclusion is using data (e.g., presence of Plugin AFN entity versus presence of Plugin MFN entity), but the fact that they are exclusive is not modeled. Another issue is that the exclusion may not be validated or enforced at runtime.

Figure 5:
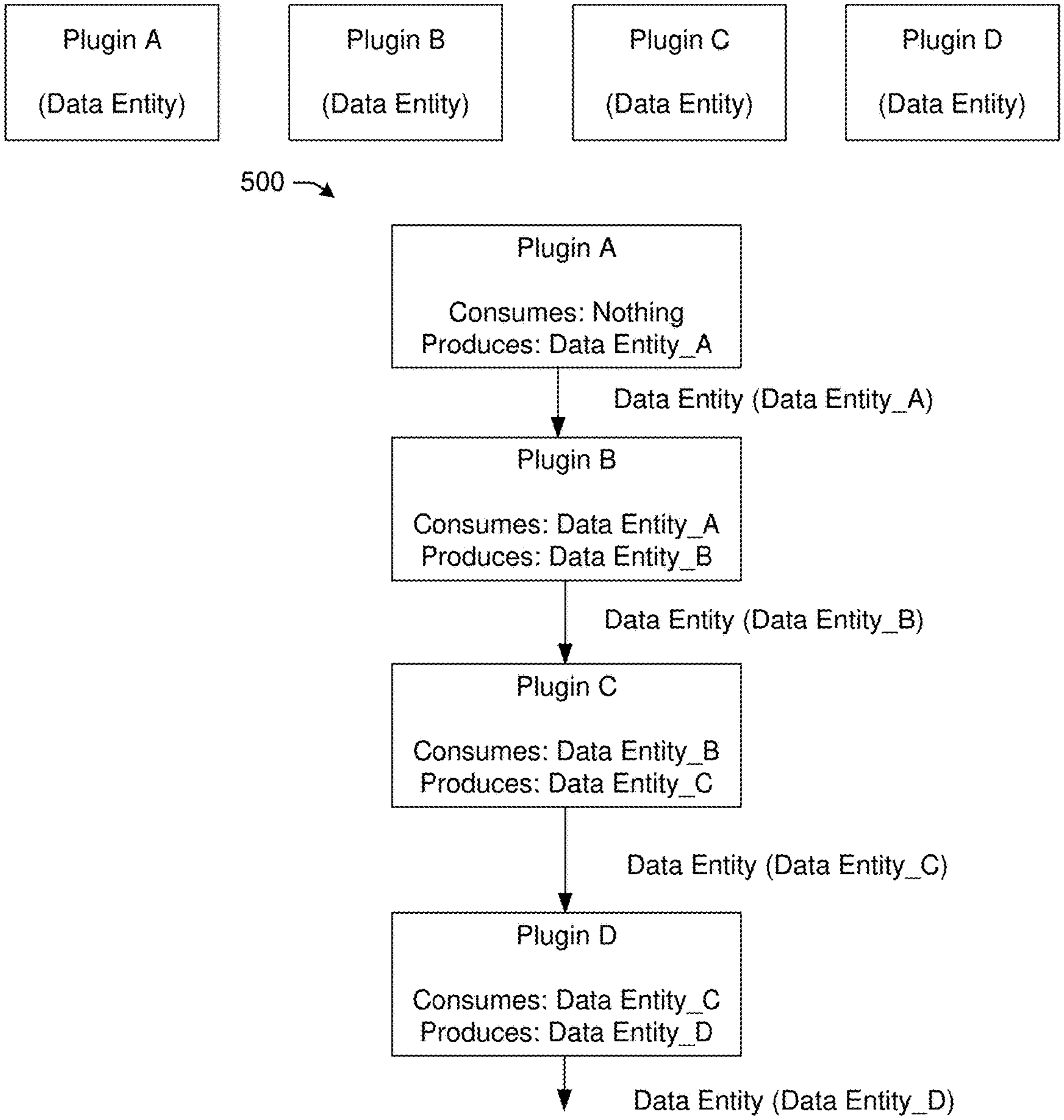
FIG. 5 shows an example solution to cycle dependency using enhanced labels in accordance with one or more embodiments of the present disclosure.

FIG. 5 shows an example solution to cycle dependency using enhanced labels in accordance with one or more embodiments of the present disclosure.

Referring to FIG. 5, a dependency graph 500 of Plugins A-D with only "Data Entity" is replaced with enhanced labels of the plugins. Each of the plugins A-D use the data entity "Data Entity" in some way, so to resolve the resulting cycle between the plugins A-D, each of the plugins A-D may replace the "Data Entity" label with different individual labels for "Data Entity." For example, Plugin A uses "Data Entity_A" for its label of the Data Entity. Plugin B uses "Data Entity_B" for its label of the Data Entity. Plugin C uses "Data Entity_C" for its label of the Data Entity. This allows the dependency cycles to be resolved.

The labels must be well-known and defined in both producer and consumer plugins to allow the label governance workflow 120 to pass its governance verifications.

Still referring to FIG. 5, the dependency graph 500 may be based on a dependency table 502 that includes the labels for data entities consumed and produced by the plugins A-D. Table 502 makes the topology for the dependency graph 500 sortable. In the example of FIG. 5, Plugin A consumes nothing and produces Data Entity_A, Plugin B consumes Data Entity_A and produces Data Entity_B, Plugin C consumes Data Entity_C and produces Data Entity_D. As a result, a dependency cycle is resolved.

Figure 6:
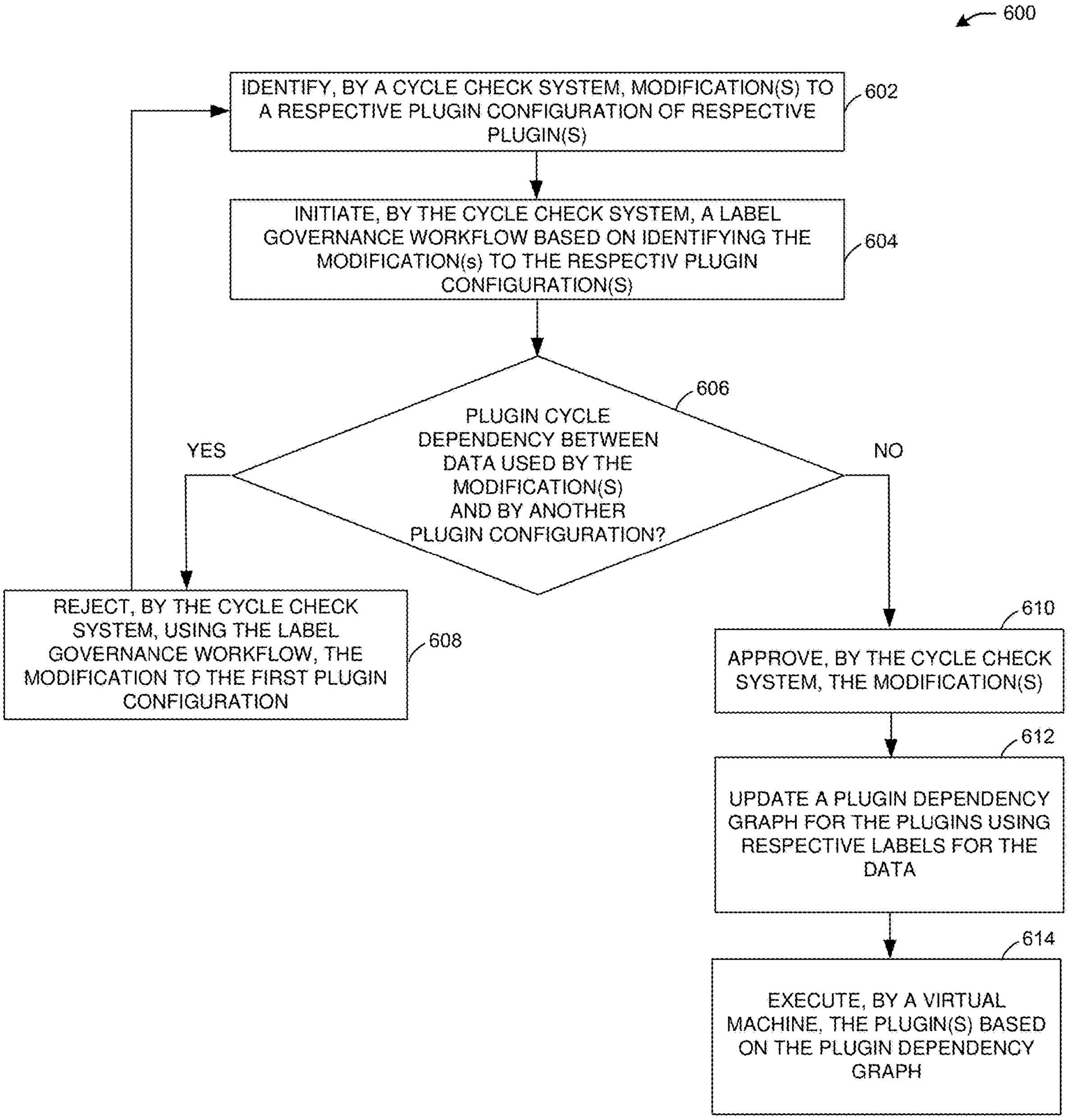
FIG. 6 is an example flow of a process for mitigating plugin cycles for plugin configurations federated from multiple pipelines, in accordance with one or more embodiments of the present disclosure.

FIG. 6 is an example flow of a process 600 for mitigating plugin cycles for plugin configurations federated from multiple pipelines, in accordance with one or more embodiments of the present disclosure.

At block 602, a cycle check device (or system, e.g., the cycle check modules 114 of FIG. 1) may identify respective modifications to respective plugin configurations for respective plugins. For example, as shown in FIG. 1, multiple plugin configurations may be federated from different respective pipelines. When a plugin configuration is updated from any of the pipelines, the cycle check device may evaluate the plugin configuration update to ensure that it does not result in a plugin cycle dependency with another plugin's configuration.

At block 604, the cycle check device may initiate a label governance workflow (e.g., the label governance workflow 120 of FIG. 1) based on identifying a plugin configuration modification at block 602.

At block 606, the cycle check device may determine whether the identified plugin configuration modification at block 602 results in a plugin cycle dependency between data used by multiple plugin configurations. The cycle dependency may include two or more plugins using the same data with a same label.

When there is a plugin cycle dependency at block 606, the device may, at block 608, reject, as part of the label governance workflow, any plugin configuration modification that would result in a plugin cycle dependency. As a result, the process 600 may conclude the label governance workflow triggered by the respective plugin cycle modification, and return to block 602, where any other plugin modification may trigger another respective label governance workflow at block 604. The modification at block 602 may include an updated label for the data that was the cause of the plugin cycle dependency at block 606, so the label governance workflow at block 604 may include evaluating the updated labels of respective configurations for the data causing a plugin cycle dependency between two or more plugin configurations.

At block 606, once there is no plugin cycle dependency resulting in a plugin modification detected at block 602, the process 600 may proceed to block 610, where the cycle check device may approve the one or more plugin modifications identified at block 602 and triggering the federated label governance workflow at block 604.

Once the plugin cycle modifications are approved in a label governance workflow, the process 600 may continue to block 612, where a graph-building device (or system, e.g., the graph-building modules 103 of FIG. 1) may update a plugin dependency graph for the plugins using the respective labels for the data. At block 614, a virtual machine may execute one or more of the plugins based on the plugin dependency graph, and therefore avoids a plugin cycle dependency because the plugin dependency graph uses the updated and approved labels for the data.

The examples herein are not meant to be limiting.

Figure 7:
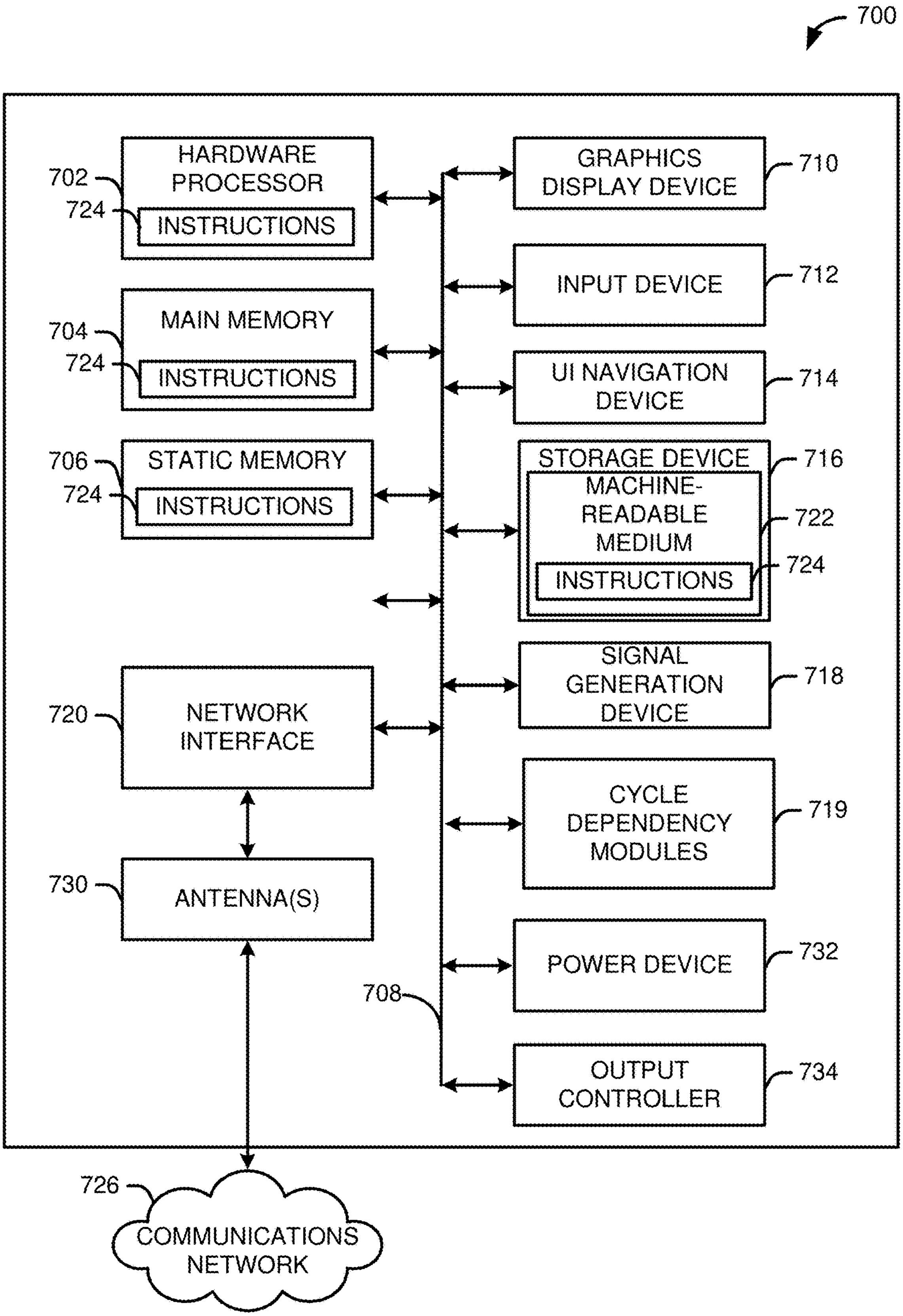
FIG. 7 illustrates a block diagram of an example machine upon which any of one or more techniques (e.g., methods) may be performed, in accordance with one or more example embodiments of the present disclosure.

FIG. 7 illustrates a block diagram of an example machine upon which any of one or more techniques (e.g., methods) may be performed, in accordance with one or more example embodiments of the present disclosure.

In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 700 (e.g., computer system) may include a hardware processor 702 (e.g., a central processing unit (CPU), a graphics processing unit (GPU), a hardware processor core, a tensor processing unit (TPU), or any combination thereof), a main memory 704 and a static memory 706, some or all of which may communicate with each other via an interlink (e.g., bus 708). The machine 700 may further include a power device 732, a graphics display device 710, an input device 712 (e.g., a keyboard), and a user interface UI navigation device 714 (e.g., a mouse). In an example, the graphics display device 710, input device 712, and UI navigation device 714 may be a touch screen display. The machine 700 may additionally include a storage device 716, a signal generation device 718, one or more cycle dependency modules 719 (e.g., representing the components of FIG. 1, and capable of performing the operations of FIGS. 1-6), and a network interface 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine-readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 720 may include one or more physical jacks (e.g., Ethernet, coaxial, or phone jacks) or one or more antennas to connect to the communications network 726. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

The term "cloud computing" or "cloud" at least in some examples refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "compute resource" or simply "resource" at least in some examples refers to an object with a type, associated data, a set of methods that operate on it, and, if applicable, relationships to other resources. Additionally or alternatively, the term "compute resource" or "resource" at least in some examples refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and the like), operating systems, virtual machines (VMs), software/applications, computer files, and/or the like. A "hardware resource" at least in some examples refers to compute, storage, and/or network resources provided by physical hardware element(s). A "virtualized resource" at least in some examples refers to compute, storage, and/or network resources provided by virtualization infrastructure to an application, device, system, and the like. The term "network resource" or "communication resource" at least in some examples refers to resources that are accessible by computer devices/systems via a communications network. The term "system resources" at least in some examples refers to any kind of shared entities to provide services, and includes computing and/or network resources. System resources may be considered as a set of coherent functions, network data objects or services, accessible through a server where such system resources reside on a single host or multiple hosts and are clearly identifiable.

The term "cloud service provider" or "CSP" at least in some examples refers to an organization that operates or otherwise provides cloud resources including, for example, centralized, regional, and/or edge data centers and/or the like. In some examples, the term "cloud computing" refers to computing resources and services offered by a CSP.

The term "data center" at least in some examples refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "application programming interface" or "API" at least in some examples refers to a set of subroutine definitions, communication protocols, and tools for building software. Additionally or alternatively, the term "application programming interface" or "API" at least in some examples refers to a set of clearly defined methods of communication among various components. In some examples, an API may be defined or otherwise used for a web-based system, operating system, database system, computer hardware, software library, and/or the like.

The terms "instantiate," "instantiation," and the like at least in some examples refers to the creation of an instance. In some examples, an "instance" also at least in some examples refers to a concrete occurrence of an object, which may occur, for example, during execution of program code.

What is claimed is:

1. A method for mitigating plugin cycles for plugin configurations federated from multiple pipelines, the method comprising:

identifying, by at least one processor of a cycle check system, a first modification to a first plugin configuration for a first plugin;

initiating, by the at least one processor of the cycle check system, a label governance workflow based on identifying the first modification to the first plugin configuration;

identifying, by at least one processor of the cycle check system, using the label governance workflow initiated based on the first modification, a plugin cycle dependency between data used by the first modification to the first plugin configuration and a second plugin configuration for a second plugin, wherein the first modification to the first plugin configuration and the second plugin configuration are federated from multiple pipelines;

rejecting, by the at least one processor of the cycle check system, using the label governance workflow, the first modification to the first plugin configuration based on the plugin cycle dependency;

identifying, by the at least one processor of the cycle check system, a second modification to the first plugin configuration, the second modification comprising a first label for the data;

identifying, by the at least one processor of the cycle check system, a third modification to the second plugin configuration, the third modification to the second plugin configuration comprising a second label for the data different than the first label;

initiating, by the at least one processor of the cycle check system, a label governance workflow based on the second modification and the third modification;

approving, by the at least one processor of the cycle check system, using the label governance workflow initiated based on the second modification and the third modification, the second modification and the third modification;

updating, by at least one processor associated with a dependency graph-building system, a plugin dependency graph for the first plugin and the second plugin using the first label and the second label, wherein the plugin dependency graph excludes the plugin cycle dependency; and executing, by the at least one processor of a service of a virtual machine, the first plugin and the second plugin based on the plugin dependency graph.

2. The method of claim 1, further comprising:

generating, based on the first label and the second label, a dependency table defining which data entities are consumed and produced by the first plugin configuration and the second plugin configuration, wherein updating the dependency graph is based on the dependency table.

3. The method of claim 1, further comprising:

detecting, by the at least one processor of the cycle check system, using the label governance workflow initiated based on the second modification and the third modification, that no plugin cycle dependency exists between the second modification and the third modification, wherein approving the second modification and the third modification is based on detecting that no plugin cycle dependency exists between the second modification and the third modification.

4. The method of claim 1, further comprising:

identifying, a fourth modification to a third plugin configuration of a third plugin, the fourth modification comprising a third label for the data;

identifying a consumer of the data depending on the third plugin; and blocking use of the third label based on identifying the consumer.

5. A method for mitigating plugin cycles for plugin configurations federated from multiple pipelines, the method comprising:

identifying, by at least one processor of a cycle check system, a first modification to a first plugin configuration for a first plugin;

initiating, by the at least one processor of the cycle check system, a label governance workflow based on identifying the first modification;

identifying, by at least one processor of the cycle check system, using the label governance workflow initiated based on the first modification, a plugin cycle dependency between data used by the first modification to the first plugin configuration and a second plugin configuration for a second plugin, wherein the first modification to the first plugin configuration and the second plugin configuration are federated from multiple pipelines;

rejecting, by the at least one processor of the cycle check system, using the label governance workflow initiated based on the first modification, the first modification to the first plugin configuration based on the plugin cycle dependency;

identifying, by the at least one processor of the cycle check system, a second modification to the first plugin configuration, the second modification comprising a first label for the data;

initiating, by the at least one processor of the cycle check system, a label governance workflow based on the second modification;

approving, by the at least one processor of the cycle check system, using the label governance workflow initiated based on the second modification, the second modification;

updating, by at least one processor associated with a dependency graph-building system, a plugin dependency graph for the first plugin and the second plugin using the first label, wherein the plugin dependency graph excludes the plugin cycle dependency; and executing, by the at least one processor of a virtual machine, the first plugin based on the plugin dependency graph.

6. The method of claim 5, wherein the first plugin comprises the first plugin configuration and first remote code, and wherein the first label is not applied to the first remote code.

7. The method of claim 5, further comprising:

identifying, by the at least one processor of the cycle check system, a third modification to the second plugin configuration, the third modification to the second plugin configuration comprising a second label for the data different than the first label; and detecting, by the at least one processor of the cycle check system, using the label governance workflow initiated based on the second modification and the third modification, that no plugin cycle dependency exists between the second modification and the third modification.

8. The method of claim 7, wherein approving the second modification and the third modification is based on detecting that no plugin cycle dependency exists between the second modification and the third modification.

9. The method of claim 5, further comprising:

receiving, for a third plugin configuration of a third plugin, a third label for the data;

identifying a consumer of the data depending on the third plugin; and blocking use of the third label based on identifying the consumer.

10. The method of claim 5, wherein the first plugin is deployable based on the first plugin configuration independently of the second plugin, wherein the first plugin configuration is federated from a first plugin pipeline of the multiple pipelines, and wherein the second plugin configuration is federated from a second plugin pipeline of the multiple pipelines.

11. The method of claim 5, wherein the first label is a first modification of a third label of the data, and wherein a second label of the second plugin configuration is a second modification of the third label.

12. The method of claim 11, wherein the executing comprises:

consuming, by the first plugin configuration, the data using the third label;

producing, by the first plugin configuration, second data using the first label;

consuming, by the second plugin configuration, the second data using the first label; and producing, by the second plugin configuration, third data using the second label.

13. The method of claim 12, wherein remote code of the first plugging produces the second data and the third data without applying the first label or the second label.

14. The method of claim 12, wherein a consumer of the second data or the third data is not provided the first label or the second label.

15. A system for mitigating plugin cycles for plugin configurations federated from multiple pipelines, the system comprising:

a virtual machine comprising a plugin execution service and a plugin deployment client;

a plugin deployment service;

plugin configuration deployment pipelines from which plugin configurations are federated to the plugin deployment service;

a cycle check system; and a dependency graph-building system, wherein the virtual machine is configured to receive a user request associated with executing a first plugin, wherein the cycle check system is configured to:

identify a first modification to a first plugin configuration for a first plugin;

initiate a label governance workflow based on identifying the first modification;

identify, using the label governance workflow initiated based on the first modification, a plugin cycle dependency between data used by the first modification to the first plugin configuration and a second plugin configuration for a second plugin, wherein the first modification to the first plugin configuration and the second plugin configuration are federated from multiple pipelines;

reject, using the label governance workflow initiated based on the first modification, the first modification to the first plugin configuration based on the plugin cycle dependency;

identify a second modification to the first plugin configuration, the second modification comprising a first label for the data;

initiate a label governance workflow based on the second modification; and approve, using the label governance workflow initiated based on the second modification, the second modification;

wherein the dependency graph-building system is configured to update a plugin dependency graph for the first plugin and the second plugin using the first label, wherein the plugin dependency graph excludes the plugin cycle dependency, and wherein the virtual machine is further configured to execute, by at least one processor of the service of the virtual machine, the first plugin based on the plugin dependency graph.

16. The system of claim 15, wherein the cycle check system is further configured to:

identify a third modification to the second plugin configuration, the third modification to the second plugin configuration comprising a second label for the data different than the first label; and detect, using the label governance workflow initiated based on the second modification and the third modification, that no plugin cycle dependency exists between the second modification and the third modification.

17. The system of claim 16, wherein approving the second modification and the third modification is based on detecting that no plugin cycle dependency exists between the second modification and the third modification.

18. The system of claim 15, wherein the first plugin is deployable based on the first plugin configuration independently of the second plugin, wherein the first plugin configuration is federated from a first plugin pipeline of the multiple pipelines, and wherein the second plugin configuration is federated from a second plugin pipeline of the multiple pipelines.

19. The system of claim 15, wherein the first label is a first modification of a third label of the data, and wherein a second label used by the second plugin configuration is a second modification of the third label.

20. The system of claim 19, wherein the executing comprises to:

consume, by the first plugin configuration, the data using the third label;

produce, by the first plugin configuration, second data using the first label;

consume, by the second plugin configuration, the second data using the first label; and produce, by the second plugin configuration, third data using the second label.

* * * * *